United States Patent [19]
Shoge

[11] Patent Number: 5,928,103
[45] Date of Patent: Jul. 27, 1999

[54] INTERNAL BICYCLE HUB TRANSMISSION WITH A CLUTCH THAT ROTATES AND MOVES AXIALLY

[75] Inventor: Akihiko Shoge, Shimonoseki, Japan

[73] Assignee: Shimano, Inc., Osaka, Japan

[21] Appl. No.: 09/074,497

[22] Filed: May 6, 1998

[30] Foreign Application Priority Data

May 8, 1997 [JP] Japan .................................... 9-117995

[51] Int. Cl.[6] .................................................. B62M 11/16
[52] U.S. Cl. .......................................................... 475/297
[58] Field of Search ................................... 475/324, 297, 475/326

[56] References Cited

U.S. PATENT DOCUMENTS

| | | | |
|---|---|---|---|
| 4,240,533 | 12/1980 | Fukui .................................... | 192/6 A |
| 4,276,973 | 7/1981 | Fukui .................................... | 192/47 |
| 5,078,664 | 1/1992 | Nagano ................................. | 475/297 |

FOREIGN PATENT DOCUMENTS

| | | | |
|---|---|---|---|
| 2717305 | 11/1977 | Germany . | |
| 3443592 A1 | 8/1985 | Germany . | |
| 61-22076 | 7/1986 | Japan ............................ | B62M 11/16 |
| 9-286371 | 11/1997 | Japan ............................ | B62M 11/16 |

OTHER PUBLICATIONS

European Search Report for EP 98108378.5, dated Dec. 7, 1998.

*Primary Examiner*—Dirk Wright
*Attorney, Agent, or Firm*—James A. Deland

[57] ABSTRACT

An internal hub transmission for a bicycle includes a hub axle having an axle axis for retaining the transmission to a bicycle frame, a driver rotatably supported relative to the hub axle, an output member rotatably supported relative to the hub axle, and a planet gear mechanism. The planet gear mechanism includes a sun gear disposed around the hub axle, a gear frame rotatably supported relative to the hub axle, a planet gear rotatably supported on the gear frame and meshing with the sun gear, and a ring gear rotatably supported relative to the hub axle and meshing with the planet gear. A first one-way clutch disposed in a transmission path between the driver and the output member, and a second one-way clutch disposed in a transmission path between the driver and the ring gear. A clutch member is supported on the axle for selectively changing a transmission path between the driver and the output member, wherein the clutch member rotates around the axle in response to rotation of the driver and moves axially relative to the hub axle. A clutch control component provides movement of the clutch member in the direction of the axle axis and engages the clutch member for converting rotational motion of the clutch member into motion of the clutch member in the direction of the axle axis. This axial motion assists the shifting operation by overcoming the frictional force of the transmission components.

53 Claims, 10 Drawing Sheets

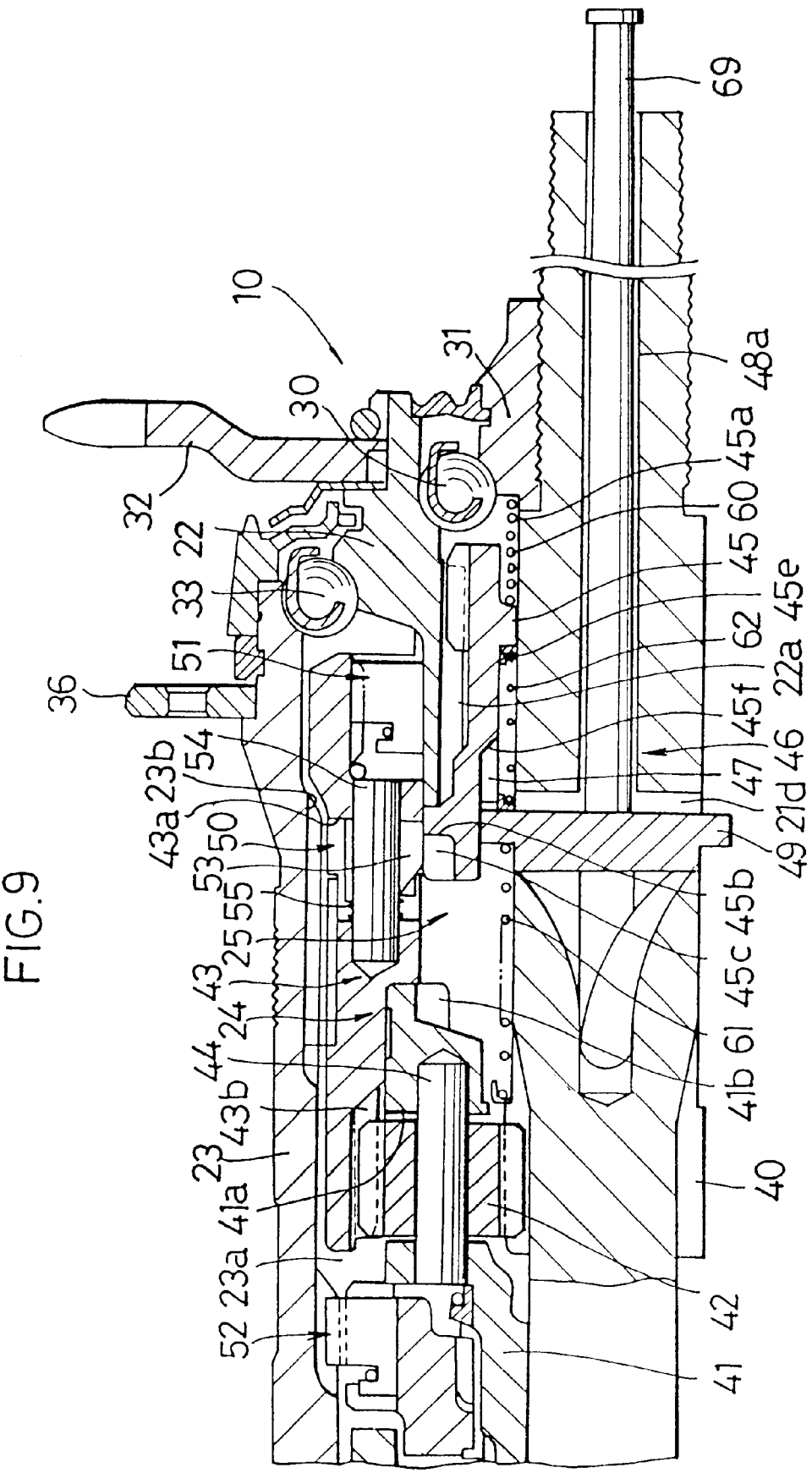

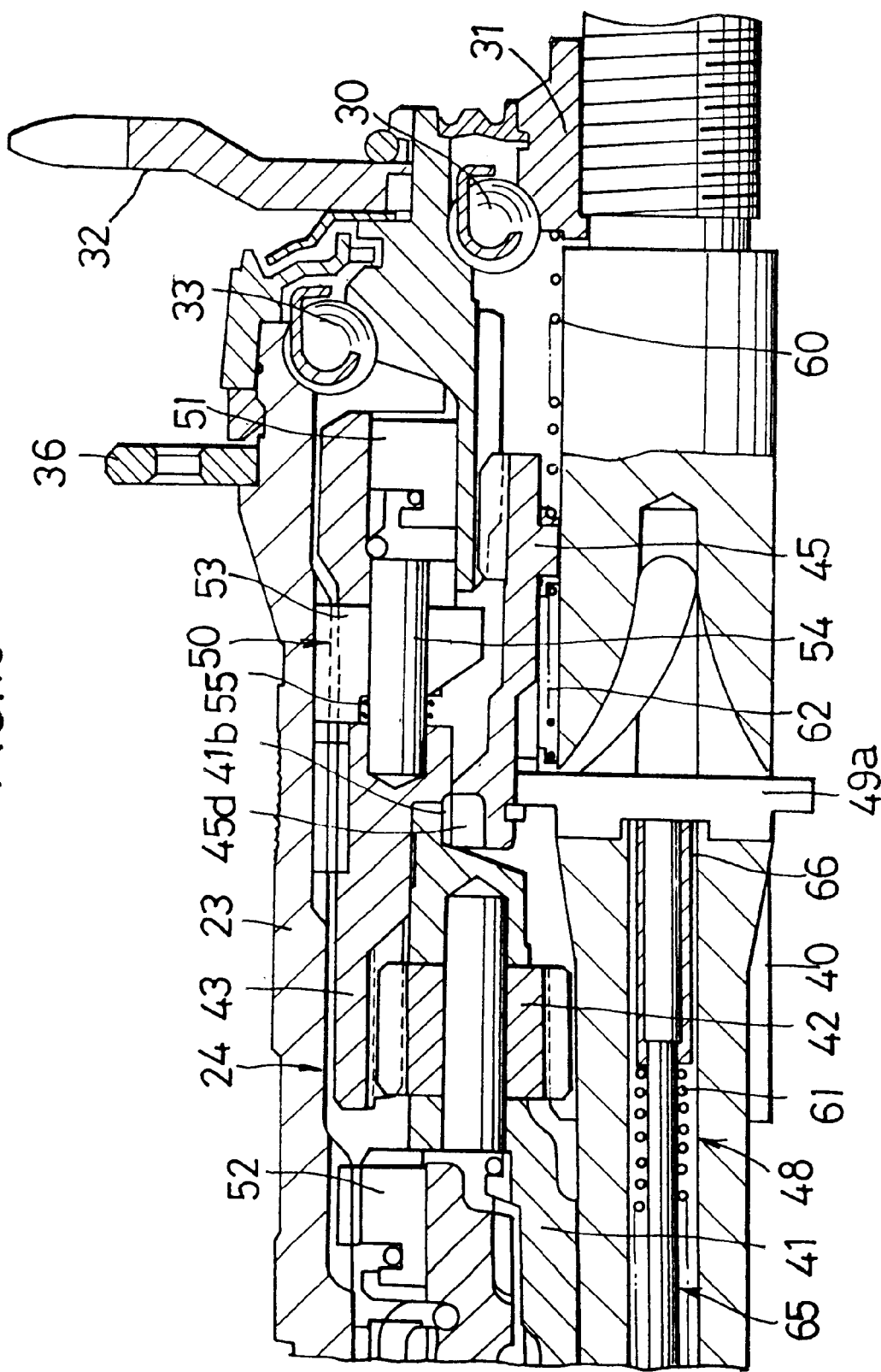

_____

INTERNAL BICYCLE HUB TRANSMISSION WITH A CLUTCH THAT ROTATES AND MOVES AXIALLY

BACKGROUND OF THE INVENTION

The present invention is directed internal bicycle hub transmissions and, more particularly, to an internal hub transmission with a clutch that rotates and moves axially.

Bicycles, particularly recreational bicycles referred to as city cruisers, are inexpensive and are easy to ride, and are thus widely used to commute to work or school or for shopping. With this type of recreational bicycle, an internal hub transmission is sometimes mounted at the rear wheel in order to ride at high speeds over flat terrain or to ride uphill with minimal exertion.

An internal hub transmission generally comprises a hub axle that is fixed to the bicycle frame; a hub shell that is able to rotate around the hub axle; a planet gear mechanism that is housed in the hub shell; a clutch mechanism for selecting among a plurality of drive transmission paths with an interposed planet gear mechanism; and a bell crank for moving the clutch member. The clutch mechanism has a clutch member for switching the drive transmission path by moving in the direction of the hub axis, and a push rod that presses the clutch member. The bell crank is linked via a shift cable to a shift lever mounted to the handlebar, for example, in order to control shifts.

With a typical internal hub transmission, operation of the shift lever winds and pulls the inner cable of the shift cable, thus causing the bell crank to push on the push rod and move the clutch member in one axial direction to perform a gear shift from a higher to a lower speed step (downshifting). However, when the inner cable is slackened to perform a gear shift from a lower to a higher speed step (upshifting), the clutch member will not move in the opposite direction by movement of the push rod alone. Therefore, the biasing force of a return spring or the like is normally used to assist movement of the clutch member in the other axial direction.

With the conventional internal hub transmission described above, a large amount of resistance is generated between the clutch member and the parts that make up the planet gear mechanism when a large drive force is applied. More specifically, when a large drive force is applied, frictional force increases in the engaged portions between the clutch member and the parts that make up the planet gear mechanism, and this makes it more difficult for the gears to be shifted by movement of the clutch member. In order to overcome this additional frictional force, the inner cable of the control cable must be pulled with even greater force when downshifting. Also, the spring force of the return spring must be large enough to overcome the frictional force when the inner cable is slackened when upshifting. If the spring force of the return spring is increased, however, then the inner cable of the control wire must be pulled with still greater force when downshifting. Consequently, in order to allow the gears to be shifted when a large drive force is applied during riding regardless of the direction of the shift, great strength is needed to operate the shift lever. This is, very undesirable as it makes shifting very fatiguing if not impossible for some riders.

SUMMARY OF THE INVENTION

The present invention is directed to an internal bicycle hub transmission that can be operated with a light force under all riding conditions. This is accomplished generally by using the existing rotational force of the hub to aid the shifting operation. More specifically, in one embodiment of the present invention an internal hub transmission for a bicycle includes a hub axle having an axle axis for retaining the transmission to a bicycle frame, a driver rotatably supported relative to the hub axle, an output member rotatably supported relative to the hub axle, and a planet gear mechanism. The planet gear mechanism includes a sun gear disposed around the hub axle, a gear frame rotatably supported relative to the hub axle, a planet gear rotatably supported on the gear frame and meshing with the sun gear, and a ring gear rotatably supported relative to the hub axle and meshing with the planet gear. A first one-way clutch is disposed in a transmission path between the driver and the output member, and a second one-way clutch is disposed in a transmission path between the driver and the ring gear. A clutch member is supported on the axle for selectively changing a transmission path between the driver and the output member, wherein the clutch member rotates around the axle in response to rotation of the driver and moves axially relative to the hub axle. A clutch control component provides movement of the clutch member in the direction of the axle axis and engages the clutch member for converting rotational motion of the clutch member into motion of the clutch member in the direction of the axle axis. This axial motion assists the shifting operation by overcoming the frictional force of the transmission components.

In a more specific embodiment, the clutch control component includes a guide surface retained to the hub axle, a shift key which moves along the guide surface for causing movement of the clutch member in the direction of the axle axis, and a shift key moving component for moving the shift key. The clutch member includes a cam surface extending in the direction of the axle axis, and the shift key presses against the cam surface for converting rotational motion of the clutch member into motion of the clutch member in the direction of the axle axis.

In an even more specific embodiment, the hub axle includes a spiral groove, wherein the spiral groove forms the guide surface. The guide surface inclines from approximately 10° to approximately 50° relative to the axle axis, and the cam surface is inclined from approximately 20° to approximately 70° relative to the axle axis. When the shift key strikes the cam surface of the clutch member, the shift key rides up onto the cam surface as a result of the rotation of the clutch member, and the rotational drive force is converted into displacement in the axial direction of the clutch member. Accordingly, the rotational drive force of the clutch member can be converted into displacement of the clutch member in the axial direction with a simple construction.

With the angles of the guide surface and the cam surface listed, it is more difficult for the shift key to move in the axial direction than for the clutch member to move in the axial direction to ensure that the clutch member will move in the axial direction to provide the assist force during normal operation. However, when an extremely large drive force is applied, the shift key rather than the clutch member will move in the axial direction. Thus, no shift will be performed when the drive force is extremely large. As a result, shifting shock will be reduced, and damage to the power transmission mechanism caused by excessive drive force will be prevented.

In an even more specific embodiment, the clutch member selectively engages the gear frame for transmitting rotational motion of the driver to the gear frame. In this case the shift key moving component may cause movement of the shift key either toward or away from the gear frame. In either case, a first biasing member biases the clutch member toward the gear frame, a second biasing member biases the shift key toward the clutch member, and a third biasing member biases the shift key away from the clutch member. The biasing members are used to balance the operation of the clutch member to ensure that the rotational force of the clutch member is used to assist the shifting operation only when needed.

BRIEF DESCRIPTION OF THE DRAWINGS

FIG. 9 is a partial cross sectional view of an alternative embodiment of an internal hub transmission according to the present invention; and FIG. 10 is a partial cross sectional view of another alternative embodiment of an internal hub transmission according to the present invention.

DETAILED DESCRIPTION OF THE EMBODIMENTS

Figure 1:
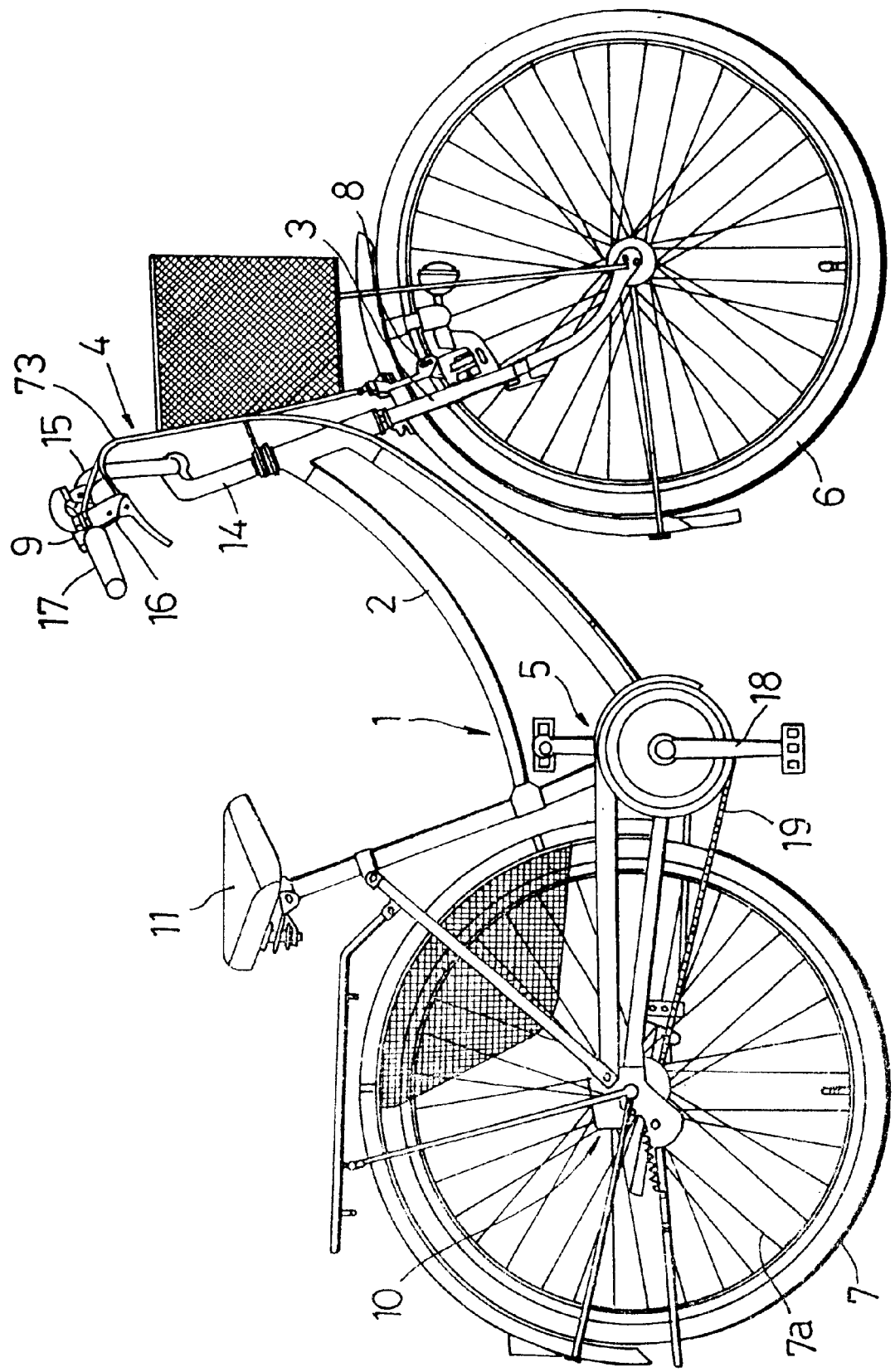
FIG. 1 is a side view of a bicycle that incorporates a particular embodiment of an internal hub transmission according to the present invention.

FIG. 1 is a side view of a bicycle that incorporates a particular embodiment of an internal hub transmission according to the present invention. This bicycle is a recreational bicycle which comprises a frame 1 having a double-loop type of frame body 2 and a front fork 3, a handle component 4, a drive component 5, a front wheel 6, a rear wheel 7 to which a three-speed internal hub transmission 10 has been mounted, a front braking apparatus 8, a gear shifter component 9 for operating the internal hub transmission 10 close at hand, and a saddle 11.

The handle component 4 has a handle stem 14 fixed to the upper portion of the front fork 3 and a handlebar 15 fixed to handle stem 14. A brake lever 16, which constitutes part of the front brake apparatus 8, a grip 17, and the gear shifter component 9 are mounted at the right end of the handlebar 15. The gear shifter component 9 is mounted on the brake lever 16 on the inside of the brake lever 16, and it is linked with internal hub transmission 10 by means of a shift control cable 73 comprising an inner cable and an outer casing formed by a spiral outer cable. The gear shifter component 9 has an ordinary structure having a winding lever for winding the inner cable and a release lever that releases the winding operation of the winding lever and plays out the inner cable, and as such it will not be described in detail herein. The drive component 5 has a gear crank 18 that is provided to the lower portion (bottom bracket portion) of the frame body 2, a chain 19 that goes around the gear crank 18, and the internal hub transmission 10.

Figure 2:
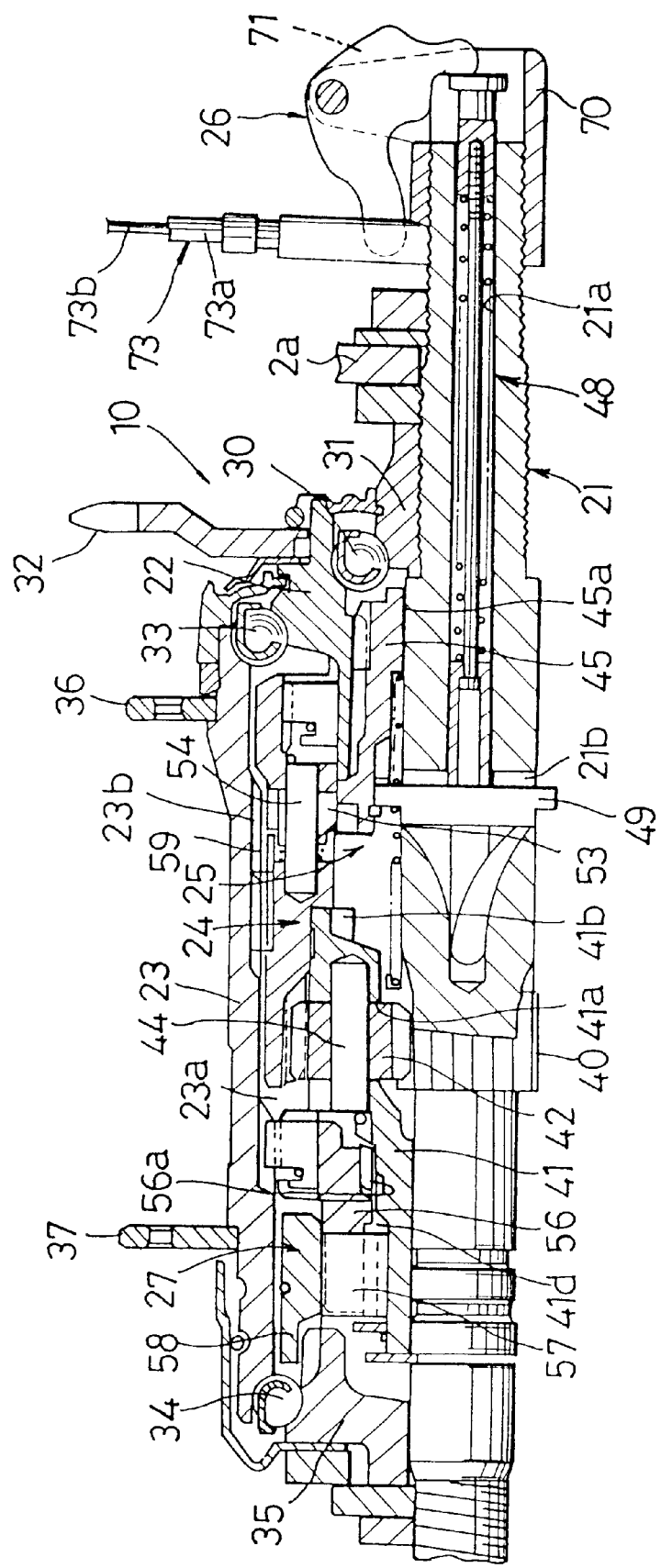
FIG. 2 is a partial cross sectional view of a particular embodiment of an internal hub transmission according to the present invention.

The internal hub transmission 10 is a coaster brake-equipped hub with a three-stage structure including power transmission paths for downshifting, direct drive, and upshifting. As shown in FIG. 2, internal hub transmission 10 has a hub axle 21 fixed to the rear dropout 2a of the frame body 2 of the bicycle, a driver 22 disposed around the outer periphery at one end of the hub axle 21, a hub shell 23 disposed further around the outer periphery of the hub axle 21 and the driver 22, a planet gear mechanism 24, an operation mechanism 25 for selecting a power transmission path, a bell crank 26 for actuating the operation mechanism 25, and a coaster brake 27.

Figure 3:
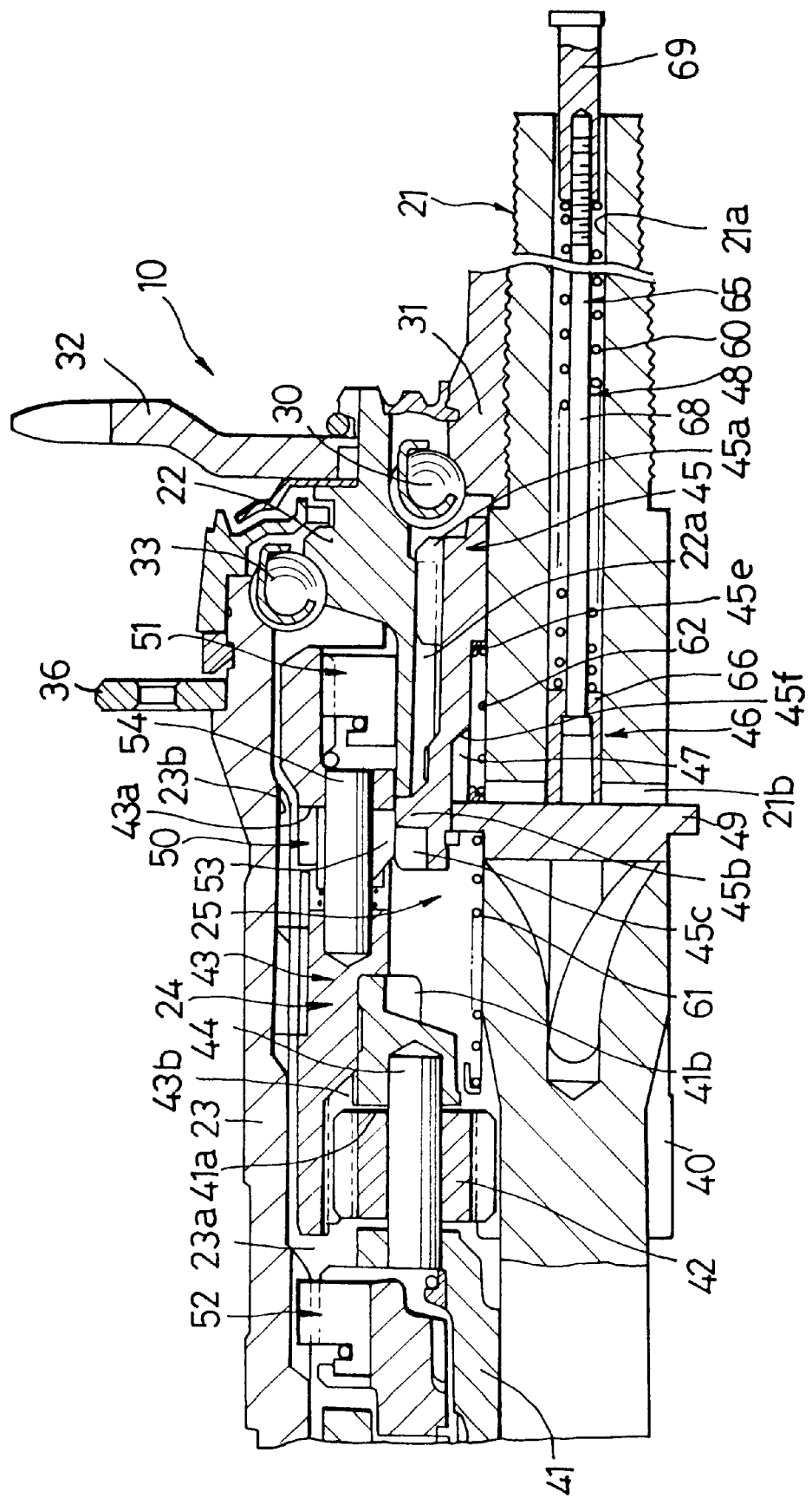
FIG. 3 is an enlarged detail view of the internal hub transmission of FIG. 2 in a low speed position.

As shown in FIGS. 2 and 3, the hub axle 21 is a rod-like member which has a larger diameter in its middle and a smaller diameter at both ends. Threads are formed at both ends of hub axle 21. An operation hole 21a is formed in the axial portion of the hub axle 21 from the right end to the center in FIG. 2, and a through-groove 21b is formed in the vicinity of the bottom of the operation hole 21a. The through-groove 21b goes through the axis of the hub axle 21 and is inclined by a specific groove inclination angle β (see FIG. 5) with respect to the axle axis. The through-groove 21b is formed in a twist to the side opposite the forward direction going from the right to the left in FIG. 5. Through-groove 21b is formed by using an end drill of a specific diameter to form holes that go through the axis, and then by feeding the drill toward the center in the axial direction while the hub axle 21 is slowly rotated in the forward direction. Therefore, through-groove 21b is shaped as a continuous spiral in which the through-holes intersecting at both ends rotate gradually according to movement in the axial direction. The groove inclination angle β should range from 10 to 50 degrees.

One end of the driver 22 is rotatably supported on the hub axle 21 via balls 30 and a hub cone 31, and a hub cog 32 is fixed around the outer periphery of driver 22 at one end. A plurality of serration inner teeth 22a are formed in the axial direction around the inner periphery at the other end of the driver 22. The hub shell 23 is a tubular member, and a housing space 23a around the inner periphery thereof houses the driver 22 and the planet gear mechanism 24. The hub shell 23 is able to rotate around the hub axle 21 via balls 33 and 34 and a hub cone 35. Flanges 36 and 37 for supporting spokes 7a(see FIG. 1) are fixed at both ends of the outer periphery of the hub shell 23.

The planet gear mechanism 24 has a sun gear 40 formed coaxially and integrally with the hub axle 21, a gear frame 41 disposed around the outer periphery of the hub axle 21, three planet gears 42 (only one planet gear is shown in the figure) that mesh with the sun gear 40, and a ring gear 43. The gear frame 41 is a tubular member, and it is rotatably supported on the hub axle 21. Three notches 41a are formed in the circumferential direction in the gear frame 41, and the planet gears 42 are rotatably supported by pins 44 in these various notches 41a. Serration inner teeth 41b are formed around the inner periphery at one end of the gear frame 41, and serration outer teeth 41c(FIG. 1) are formed around the outer periphery at the other end.

Figure 4:
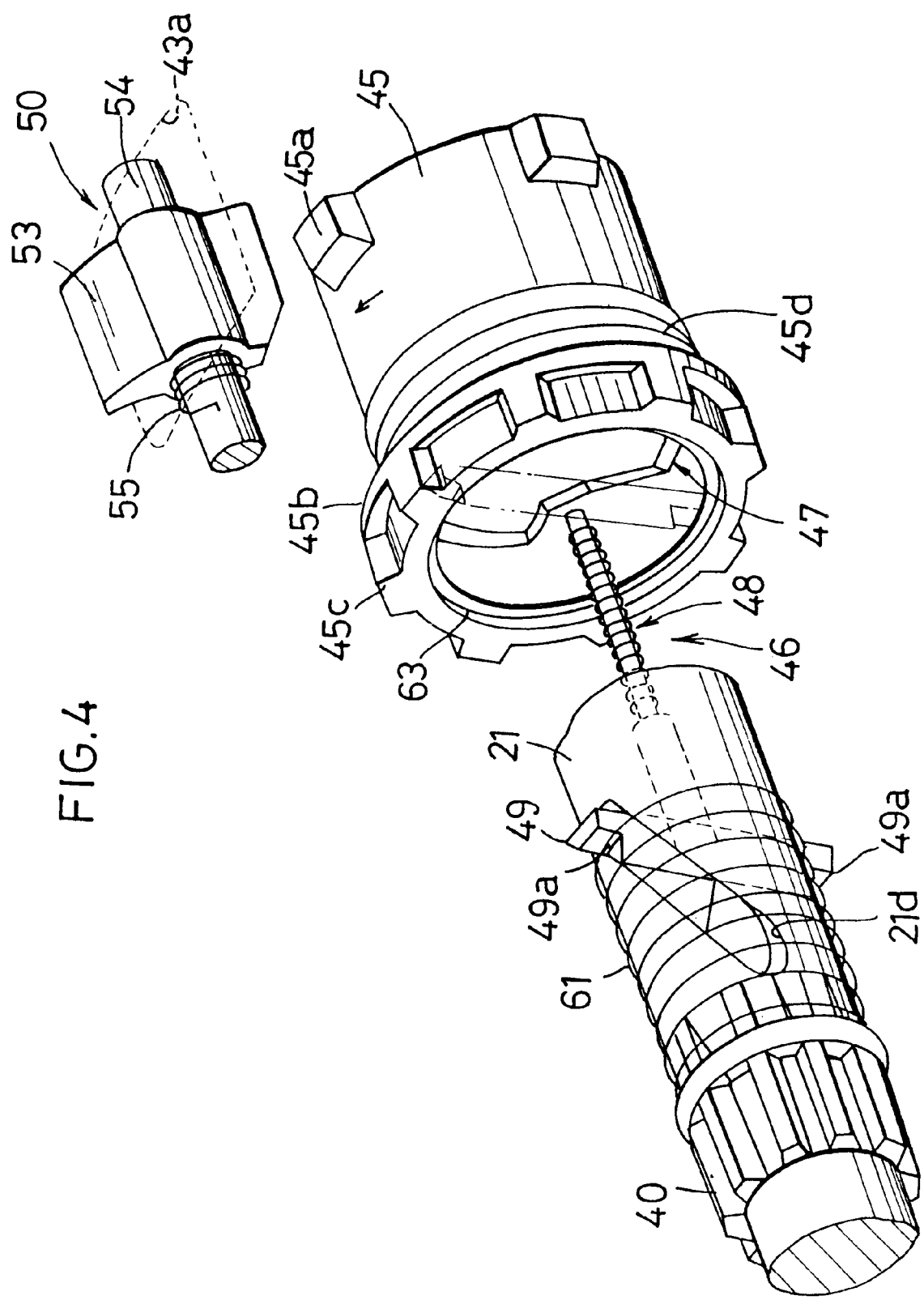
FIG. 4 is an oblique view of an operation mechanism used in the internal hub transmission shown in FIG. 2.

The ring gear 43 is formed in a nearly cylindrical shape, and it extends from the planet gears 42 to the outer periphery of the driver 22. Inner teeth 43b are formed around the inner periphery at the other end of the ring gear 43. The planet gears 42 mesh with the sun gear 40 as mentioned above, but at the same time also mesh with the inner teeth 43b of the ring gear 43. A notch 43a is formed at one end of the ring gear 43, and a clutch pawl 53 that makes up part of a first one-way clutch 50 as shown in FIG. 4 is swingably supported by a pin 54 in this notch 43a. This clutch pawl 53 is biased in the standing direction by a torsion coil spring 55 (FIG. 4). The first one-way clutch 50 transmits only rotational drive force in the forward direction from the ring gear 43 to the hub shell 23. The clutch pawl 53 meshes with the ratchet teeth 23b formed on the inner peripheral surface of the hub shell 23 only when the ring gear 43 has rotated in the forward direction. Even when in a transmission-enabled state in which the ring gear 43 rotates in the forward direction, this first one-way clutch 50 is able to switch between a power transmission state in which the clutch pawl 53 meshes with the ratchet teeth 23b and a transmission cutoff state of retraction from the ratchet teeth 23b, which is accomplished by the movement of the clutch member as discussed below.

A second one-way clutch 51 that transmits rotational drive force only in the forward direction from the driver 22 to the ring gear 43 is arranged between the driver 22 and the ring gear 43. A third one-way clutch 52 that transmits rotational drive force only in the forward direction from the gear frame 41 to the hub shell 23 is arranged between the gear frame 41 and the hub shell 23. The third one-way clutch 52 has a tubular clutch case 56 in which serration inner teeth 56a are formed around the inner periphery at one end. These serration inner teeth 56a engage with the serration outer teeth 41c of the gear frame 41, and the clutch case 56 rotates integrally with the gear frame 41. These two one-way clutches 51 and 52 are unable to perform switching in a transmission-enabled state, unlike the first one-way clutch 50.

The operation mechanism 25 is used to select the power transmission path, and it comprises a clutch member 45 and a clutch control component 46. The clutch member 45 switches the driver 22 and gear frame 41 between a linked state and a separated state, and it also switches the first one-way clutch 50 between a power transmission state and a power cutoff state. The clutch member 45 is positioned around the outer periphery of the hub axle 21 such that it can rotate and move in the axial direction.

As shown in FIG. 4, the clutch member 45 is a tubular member, and it has serration outer teeth 45a formed around the outer periphery at one end thereof. The serration outer teeth 45a are slidably engaged with the serration inner teeth 22a of driver 22. A large diameter component 45b is formed at the other end of the clutch member 45, and serration outer teeth 45c are formed around the outer periphery thereof. The serration outer teeth 45c are able to engage with the serration inner teeth 41b formed on the gear frame 41. A taper surface 4d is formed between the large diameter component 45b and one end. This taper surface 45d is provided in order to lower the clutch pawl 53 of the first one-way clutch 50 from its erected position (power transmission position) indicated by the solid line to its retracted position (power cutoff position) indicated by the two-dot chain line. When the clutch member 45 moves from the left to the downshift position on the right end, the clutch pawl 53 follows along the taper surface 45d, rides up onto the large diameter component 45b, and is lowered into a retracted attitude.

Figure 5:
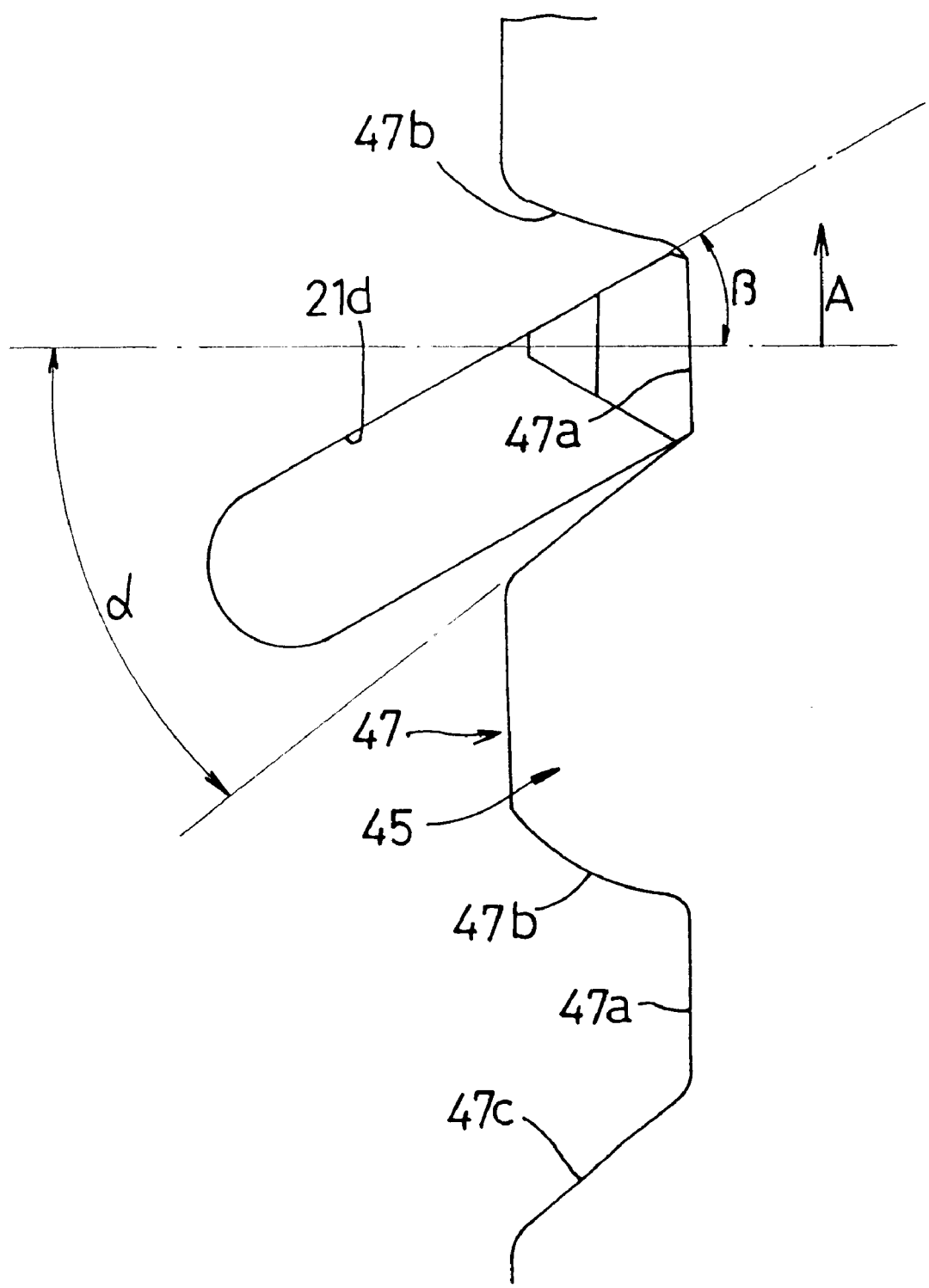
FIG. 5 is a schematic view illustrating the operation of the shift key and cam surface shown in FIG. 4.

As shown in FIG. 3, two stepped components 45e and 45f are formed around the inner periphery of the clutch member 45 with spaces between them in the axial direction. As shown in FIG. 4, a plurality of cam surfaces 47 are formed on the left step component 45f with spaces between them in the circumferential direction. As shown in FIG. 5, the cam surfaces 47 have a flat surface 47a that is depressed at one end, a curved surface 47b that leads downstream in the forward direction A of the flat surface 47a, and an inclined surface 47c that leads upstream. The inclination angle α with respect to the axle axis of this inclined surface 47c should be greater than the groove inclination angle β of the through-groove 21b, and between 20 and 70 degrees.

The clutch control component 46 moves the clutch member 45 in the axial direction of the hub axle 21, and it engages with the clutch member 45 to convert the rotational drive force of the clutch member 45 into displacement in the axial direction. The clutch control component 46 has a push rod 48 that moves in the axial direction through the operation hole 21a and a shift key 49 that is pressed to the gear frame 41 side by the push rod 48, as shown in FIG. 3.

Figure 6:
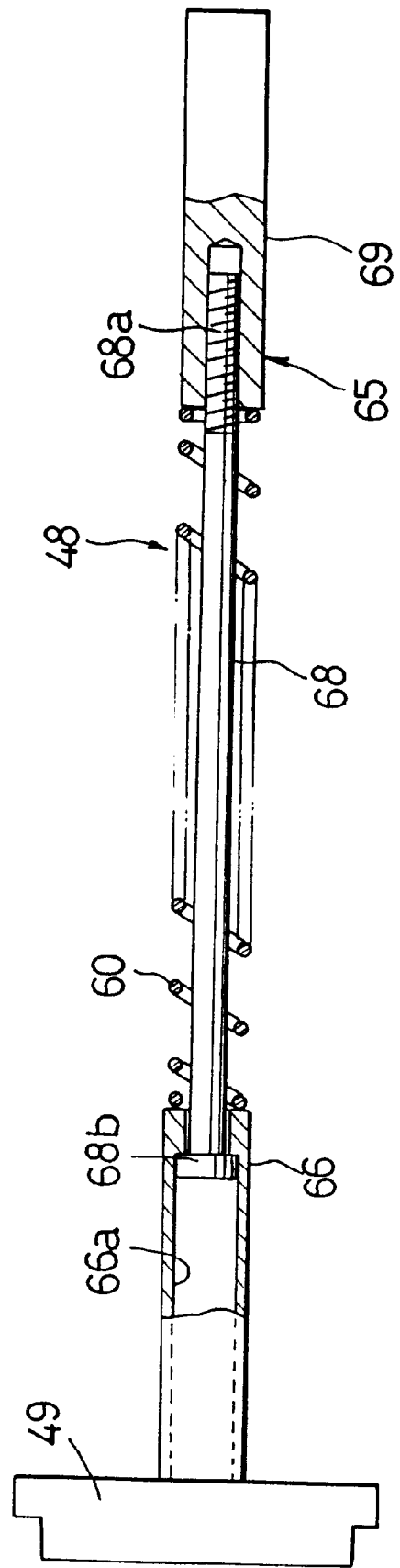
FIG. 6 is a detailed view of the push rod assembly shown in FIG. 4.

As shown in FIG. 6, the push rod 48 has an operator 65 of a specific length, an actuator 66 that is mounted on the distal end of the operator 65 such that the former can move in the axial direction, and a first coil spring 60 that is positioned between the operator 65 and the actuator 66. The operator 65 has a rod component 68 and a strike component 69 threaded onto the rod component 68. A threaded component 68a is formed on the base end of the rod component 68, and a large diameter component 68b is formed on the distal end. This threaded component 68a is threaded into the strike component 69. The large diameter component 68b is slidably mounted in a guide hole 66a formed in the interior of the actuator 66. The guide hole 66a has a smaller diameter on the actuator 66 side, which keeps the actuator 66 from coming out. The first coil spring 60 is inserted in a compressed state between the end surface of the actuator 66 and the end component of the strike component 69, and it biases the actuator 66 and the operator 65 away from each other. Thus, when the actuator 66 presses on the shift key 49, the clutch member 45 is biased toward the gear frame 41.

As shown in FIG. 4, the shift key 49 is a rod-like member with a triangular cross section. When pressed, shift key 49 moves through the through-groove 21b while turning in the opposite direction from the forward direction, that is, while twisting. The contact surface of the shift key 49 against the through-groove 21b is formed at an angle that follows the through-groove 21b. For example, when the inclination angle β of the through-groove 21b is 30 degrees, the angle of the contact surface 49b with respect to the axis is also about 30 degrees. In this embodiment, the movement of the shift key 49 is restricted to being within the clutch member 45 by a stop ring 63 mounted around the inner periphery at the other end of the clutch member 45. Therefore, the shift key 49 cannot actually come out of the clutch member 45 as shown in FIG. 4. Instead, the shift key 49 contacts stop ring 63 and moves the clutch member 45 to the left in FIG. 3.

On the other hand, the shift key 49 is able to strike the cam surfaces 47 inside the clutch member 45. If the clutch member 45 is rotated in the forward direction in a state in which the shift key 49 has struck the flat component 47a of the cam surface 47, then the shift key 49 is pressed to the guide surface of the through-groove 21b by the inclined surface 47c of the cam surface 47. As a result, the clutch member 45 moves to the right in the axial direction. Specifically, the rotational drive force of the clutch member 45 is converted into displacement in the axial direction to assist shift control.

A notch 49a is formed at both ends of the shift key 49, and against this notch 49a is stopped a second coil spring 61 that is stopped at its other end on the hub axle 21. The shift key 49 is constantly biased toward the clutch member 45 by this second coil spring 61. A third coil spring 62 is interposed between the shift key 49 and the clutch member 45. The third coil spring 62 is restricted to a specific overall length by a restricting member (not shown). When compressed, third coil spring 62 biases the shift key 49 and the clutch member 45 away from each other before the former strikes the latter. As a result, the clutch member 45 ordinarily remains at a constant distance from the shift key 49 during movement, and is accurately positioned.

In this embodiment, the biasing forces of the first through third coil springs 60, 61, and 62 decrease in that order. If the spring force of the first coil spring 60 were less than that of the second coil spring 61, then even if the shift key 49 is pressed by the push rod 48, the first coil spring 60 would contract and the shift key 49 would not move. If the spring force of the second coil spring 61 were less than that of the third coil spring 62, then even if the shift key 49 is pressed by the second coil spring 61, the shift key 49 would not go into the cam surface 47, and shift control would not be assisted.

The first coil spring 60 is positioned in a relatively large space between the operator 65 and the actuator 66 inside the operation hole 21a, so it is possible to increase the number of coils and thereby lower the spring constant and the spring force. Accordingly, the spring constants and spring forces of the second and third coil springs 61 and 62 can be further lowered, allowing a reduction in the overall force required to press the push rod 48 during an upshift. This, in turn, would decrease the operating force of the winding lever in the shift control component 9. As a result, there is less tension on the inner cable, and the inner cable does not break as frequently.

The bell crank 26 is mounted at the axial end of the hub axle 21. The bell crank 26 comprises a support bracket 70 mounted at the axial end and a link member 71 swingably supported by the support bracket 70. The outer casing 73a of a shift control cable 73 is stopped at this support bracket 70, and an inner cable 73b is stopped at the link member 71. The distal end of the link member 71 strikes the base end of the push rod 48. Pulling the inner cable 73b by means of the shift control component 9 swings the link member 71, presses the push rod 48, and executes an upshift. When the inner cable is slackened, the clutch member 45 is pressed by the second coil spring 61 via the shift key 49, and a downshift is executed.

As shown in FIG. 2, the coaster brake 27 is mounted to the clutch case 56. The coaster brake 27 comprises a brake roller 57 supported by the clutch case 56, a cam surface 41d formed around the outer periphery at the other end of the gear frame 41, and a brake shoe 58 that exerts a braking action on the inner surface at the other end of the hub shell 23. The brake roller 57 is designed such that it is pushed outward in the radial direction by the cam surface 41d when the driver 22 rotates in the reverse direction. As a result, the brake shoe 58 comes into contact with and brakes the inner surface of the hub shell 23.

Brake lock tends to occur when the coaster brake 27 is installed. Brake lock is a phenomenon whereby if the first one-way clutch 50 is in a power transmission state when the rider pedals backward to brake, the drive force will be transmitted in a state in which the brake is applied, and the brake cannot be released. A pawl cage 59 is mounted to the first one-way clutch 50 in this embodiment in order to prevent this phenomenon. The pawl cage 59 provides a specific angle of play between the ratchet teeth 23b of the hub shell 23 and the clutch pawl 53 of the first one-way clutch 50, and it allows the brake to be released while the ring gear 43 rotates by this amount of play. Specifically, the pawl cage 59 either prevents the clutch pawl 53 from being erected at a specific angle, or, even if it is erected, allows it to be erected at a position where it cannot stop the ratchet teeth 23b at the specific angle, and delays the time when the clutch pawl 53 is stopped by the ratchet teeth 23b during initial drive.

Because of the planet gear mechanism 24 and one-way clutches 50 to 52, this internal hub transmission 10 has:
- a downshift power transmission path made up of the driver 22, the ring gear 43, the planet gear mechanism 24, the gear frame 41, and the hub shell 23;
- a direct drive power transmission path made up of the driver 22, the ring gear 43, and the hub shell 23, and
- an upshift power transmission path made up of the driver 22, the clutch member 45, the gear frame 41, the planet gear mechanism 24, the ring gear 43, and the hub shell 23.

Shifting is performed by operating the push rod 48 with the bell crank 26 via the shift control cable 73. In the state shown in FIG. 3, in which the push rod 48 is not pushed in, the clutch member 45 is disposed in the downshift position at the right end, and the rotation from the driver 22 is transmitted to the hub shell 23 after being reduced in speed via the downshift power transmission path. More specifically, the rotation input to the driver 22 is transmitted to the ring gear 43 via the second one-way clutch 51. At this point, the clutch pawl 53 of the first one-way clutch 50 is rotated by the clutch member 45 to the retracted attitude shown by the two-dot chain line in FIG. 4, and the first one-way clutch 50 is in a power cutoff state. Accordingly, the rotation transmitted to the ring gear 43 is further transmitted to the hub shell 23 via the planet gear mechanism 24, the gear frame 41, and the third one-way clutch 52. In this case, the input rotation is reduced in speed according to the gear shift ratio determined by the numbers of teeth of the sun gear 40, the planet gears 42, and the ring gear 43.

Figure 7:
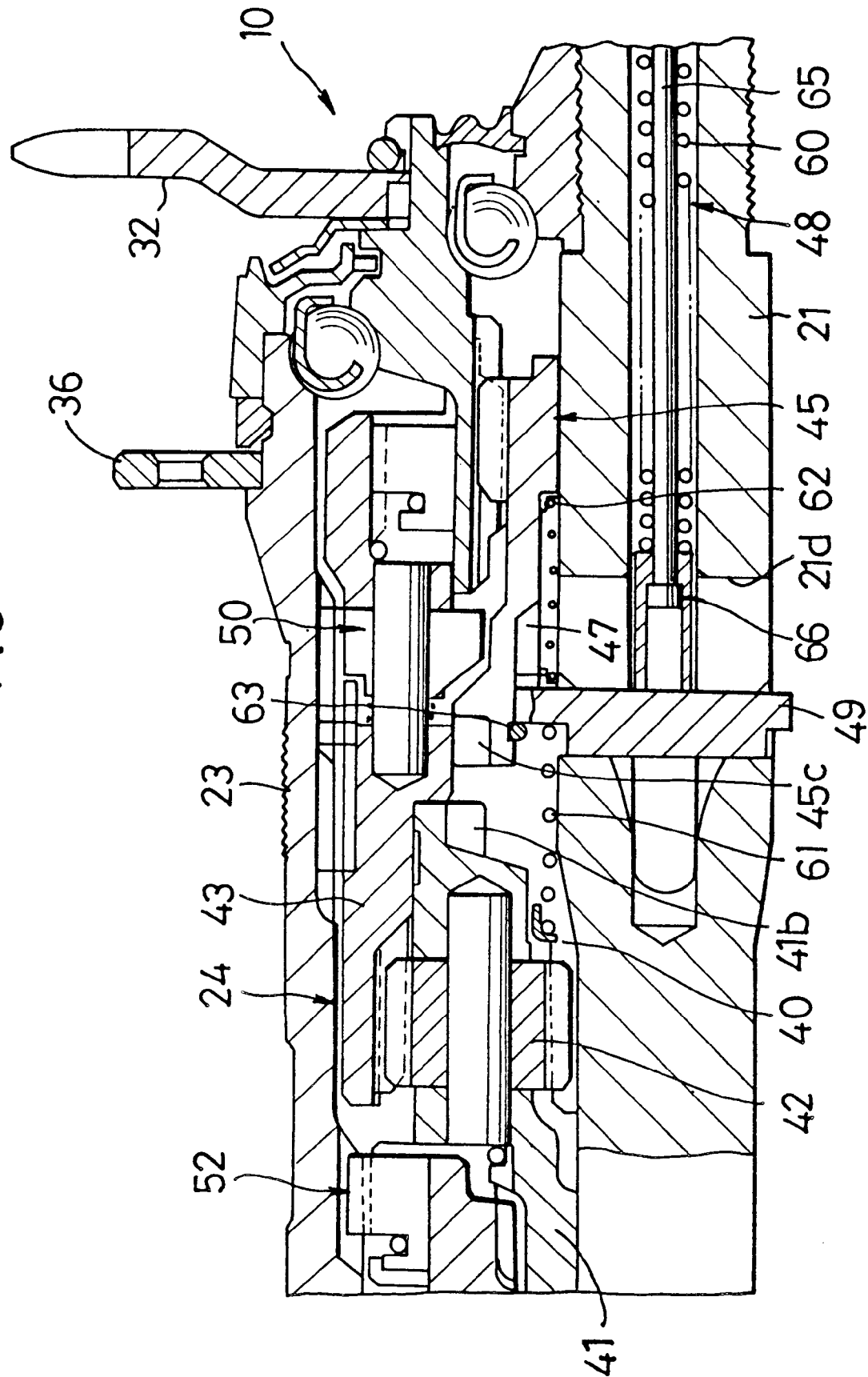
FIG. 7 is an enlarged detail view of the internal hub transmission of FIG. 2 in a direct drive position.

If the winding lever of the shift control component 9 is operated, the link member 71 of the bell crank 26 swings and pushes in the push rod 48 by one stage. As a result, since the spring force of the first coil spring 60 is greater than the spring force of the second coil spring 61, the shift key 49 is pushed by the link member 71 via the push rod 48, guided into the through-groove 21b, and moved to the left in FIG. 3 while rotating around the hub axle. The clutch member 45 is also pushed via the stop ring 63 and assumes the direct drive position. Once the clutch member 45 is disposed in the direct drive position shown in FIG. 7, the clutch pawl 53 of the first one-way clutch 50, which had been put into a retracted attitude by the taper surface 45d, is returned to the erected attitude shown by the solid line in FIG. 4 by the spring force of the torsion coil spring 55. In this state, the first one-way clutch 50 is able to transmit only rotation in the forward direction from the ring gear 43 to the hub shell 23. Therefore, the rotation from the driver 22 is directly transmitted to the hub shell 23 through the direct drive power transmission path. More specifically, the rotation input to the driver 22 is transmitted to the ring gear 43 via the second one-way clutch 51, then is transmitted to the hub shell 23 via the first one-way clutch 50, and the rotation of the driver 22 is transmitted directly to the hub shell 23 via the ring gear 43. At this point, the rotation is transmitted from the ring gear 43 to the gear frame 41 via the planet gear mechanism 24, and the gear frame 41 rotates at reduced speed, but since the rotation of the hub shell 23 is faster than that of the gear frame 41, there is no transmission of the rotation from the gear frame 41 to the hub shell 23 via the third one-way clutch 52.

When the winding lever is operated from the direct drive state and the push rod 48 is pushed in further, the shift key 49 moves further to the left, and the clutch member 45 also moves correspondingly to the upshift position. When the clutch member 45 is disposed in the upshift position shown in FIG. 8, the serration outer teeth 45c of the clutch member 45 and the serration inner teeth 41b of the gear frame 41 mesh with each other. In this movement to the upshift position, when the serration outer teeth 45c and the serration inner teeth 41b are disposed in the positions where they mesh, the clutch member 45 moves directly to the upshift position to the left after the clutch member 45 strikes the gear frame 41. When, however, these teeth are disposed in positions where they do not mesh, the shift key 49 and the clutch member 45 temporarily halt their movement to the left at the point when the clutch member 45 strikes the gear frame 41. When this happens, the actuator 66 of the push rod 48 retracts, the first coil spring 60 is compressed, and the shift key 49 is pressed. When the clutch member 45 then rotates and the two sets of teeth 45c and 41b reach their meshing positions, the spring force of the first coil spring 60 moves the clutch member 45 via the shift key 49, and the two sets of teeth 45c and 41b mesh.

In this state, the rotation transmitted to the driver 22 is transmitted to the hub shell 23 via the upshift transmission path. More specifically, rotation is transmitted from the driver 22, through the clutch member 45 and to the gear frame 41. The rotation transmitted to the gear frame 41 is transmitted to the hub shell 23 via the planet gear mechanism 24, the ring gear 43, and the first one-way clutch 50. In this case, the input rotation is increased in speed and output according to the gear shift ratio determined by the numbers of teeth of the sun gear 40, the planet gears 42, and the ring gear 43. There is an attempt at this point to transmit the rotation from the driver 22 toward the ring gear 43 via the second one-way clutch 51, but since the rotation of the ring gear 43 is faster than that of the driver 22, no rotation is transmitted from the second one-way clutch 51.

Since rotation is transmitted directly between the driver 22 and the ring gear 43 during such a shift from the downshift side to the upshift side, it is best to move the clutch member 45, which has no force acting upon it. Accordingly, the spring force of the first coil spring 60 for pushing the clutch member 45 may be reduced, and furthermore, since the spring force of the second coil spring 61 is lower than this, shift operation can be performed with a light force.

Figure 8:
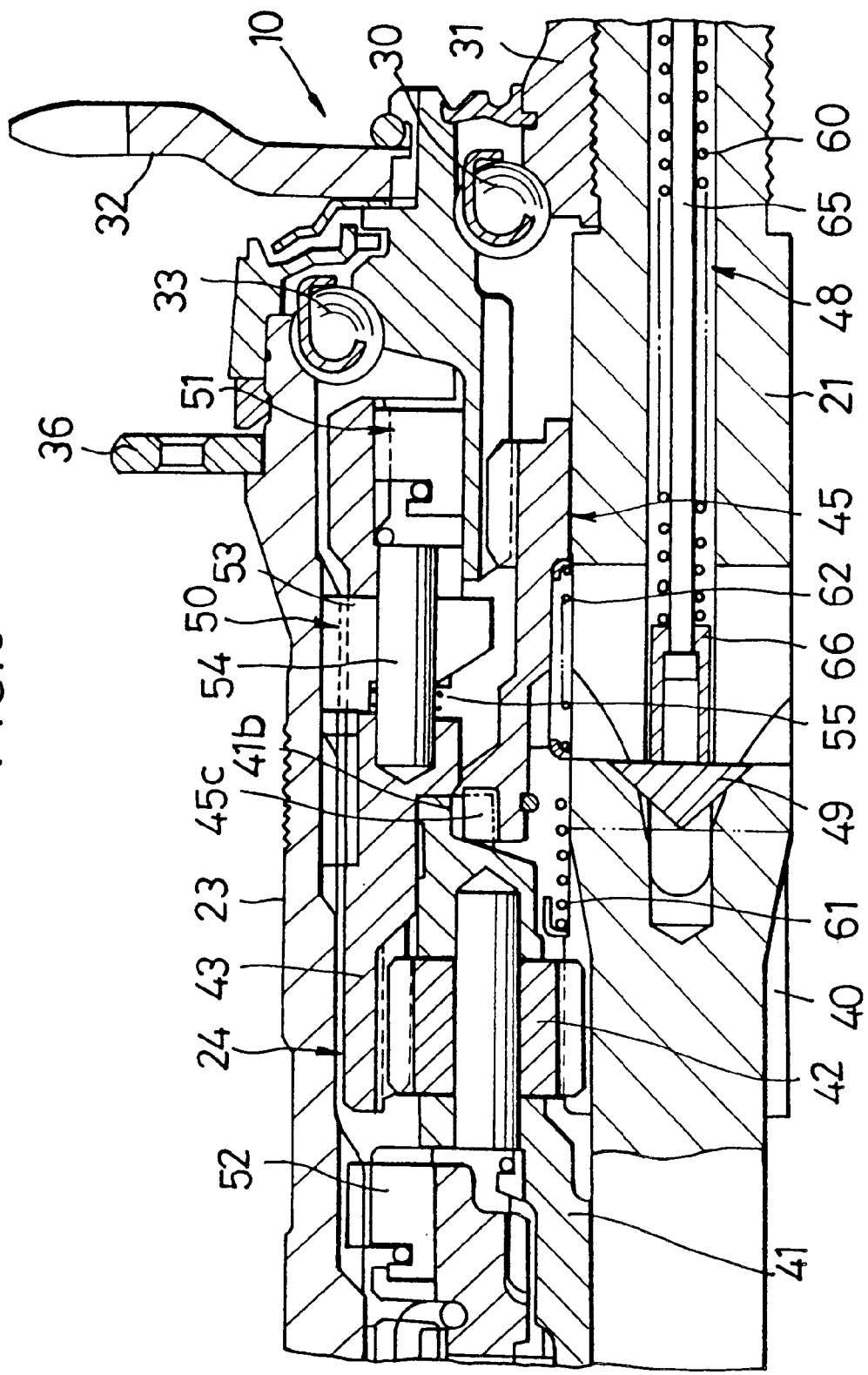
FIG. 8 is an enlarged detail view of the internal hub transmission of FIG. 2 in a high speed position.

When the release lever of the shift control component 9 is operated at the upshift position shown in FIG. 8, the biasing force of the first coil spring 60 is removed, and the second coil spring 61 presses on the shift key 49 and causes the push rod 48 to retract by one stage to the right. The shift key 49 then presses on the clutch member 45 via the third coil spring 62 and attempts to move the clutch member 45 to the direct drive position. When the rider is not pedaling and no drive force is being transmitted, the clutch member 45 readily separates from the gear frame 41, and the clutch member 45 moves to the direct drive position. If the rider is pedaling, however, since drive force is being transmitted from the clutch member 45 to the gear frame 41, frictional force may cause the serration inner teeth 41b and the serration outer teeth 45b to remain meshed. In a case such as this, the spring force of the second coil spring 61 alone will not move the clutch member 45 to the right in FIG. 8. In a state such as this, when the shift key 49 strikes the flat surface 47a of the cam surface 47 of the clutch member 45 as shown in FIG. 5, the shift key 49 is pressed to the guide surface over the entire length of the portion inserted in the through-groove 21b, and it is prevented by frictional force from escaping in the axial direction. As a result, when the shift key 49 rides up on the inclined surface 47c, the clutch member 45 moves to the right. When the serration inner teeth 41b and the serration outer teeth 45c are then unmeshed, the clutch member 45 is pressed by the second coil spring 61 via the shift key 49 and moves to the direct drive position. In other words, contact between the cam surface 47 of the clutch member 45 and the shift key 49 assists shifting by converting the rotational motion of the clutch member 45 into displacement in the axial direction.

The shift key 49 cannot readily escape to the left in the axial direction as mentioned above because it is pressed by the second coil spring 61, and the through-groove 21b is inclined and twisted in a spiral with respect to the axis. Therefore, the shift key 49 will not escape in the axial direction when the transmitted drive force is less than the biasing force of the second coil spring 61 and the frictional force between the shift key 49 and the guide surface. However, when a drive force greater than these is applied, the shift key 49 may overcome the biasing force of the second coil spring 61 and the frictional force with the guide surface and escape to the left in the axial direction without the clutch member 45 moving. The frictional force here can be set by means of the groove inclination angle β. If this groove inclination angle β is set too high, then it will be difficult for the shift key 49 to move to the left when the shift key 49 is pushed by the push rod 48. If the groove inclination angle β is set too low, however, the resistance will be smaller during pushing by the push rod 48, but the frictional force will also decrease. Therefore, the groove inclination angle β should be between 10 and 50 degrees. It is possible to adjust the drive force at the limit where the shift key 49 escapes during assist by adjusting this groove inclination angle β, the inclination angle α of the inclined surface 47c of the cam surface 47, and the spring force of the three coil springs 60 to 62.

Even when a drive force larger than the set drive force is applied and the shift key 49 escapes in the axial direction without the clutch member 45 moving, once the gear crank 18 reaches the vicinity of top dead center or bottom dead center and the drive force decreases, the clutch member 45 will be pressed by the assist force produced by the shift key 49 and will move to the right. Accordingly, a shift will not be performed when an extremely large drive force is applied, such as on a steep hill, which reduces shifting shock and helps prevent damage to the drive force transmission parts, such as the serration teeth and the one-way clutches. When the clutch member 45 finally moves, the shift key 49 is separated from the cam surface 47 by the third coil spring 62. Accordingly, there will be no noise generated by contact with the shift key 49 even if the clutch member 45 is rotated. In the direct drive position shown in FIG. 7, rotation is transmitted from the driver 22 to the hub shell 23 via the direct drive transmission path, as discussed above.

When the release lever is operated in a state in which the clutch member 45 is disposed in the direct drive position, the push rod 48 retracts further, and the shift key 49 presses on the clutch member 45. At this point the taper surface 45d of the clutch member 45 comes into contact with the clutch pawl 53 of the first one-way clutch 50 and attempts to lower the clutch pawl 53 from an erected attitude to a retracted attitude. However, because the clutch pawl 53 is transmitting power from the ring gear 43 to the hub shell 23, it is not readily lowered to a retracted attitude by the biasing force of the second coil spring 61 alone. Here again, when the shift key 49 strikes the cam surface 47 of the clutch member 45, an assist force is generated just as discussed above, the clutch member 45 is moved in the axial direction, and the clutch pawl 53 can be lowered.

Since rotation is transmitted directly to the ring gear 43, without going through the clutch member 45, there is a reduction in the operating force required during shifting in an upshift operation from the downshift side to the upshift side. Furthermore, since the rotational force of the clutch member 45 is assisted by being converted into displacement in the axial direction in a downshift operation from the upshift side to the downshift side, the rider can make a shift with a light force while still pedaling, even when upshifting.

In the above embodiment, a reduction in spring force was achieved during an upshift by installing the first coil spring 60 around the push rod, but the push rod 48a may instead be a rod-like member without an accompanying spring as shown in FIG. 9. In this case, the first coil spring 60 is disposed in a compressed state between the clutch member 45 and the hub cone 31. The spring forces of the three coil springs 60 to 62 becomes increasingly smaller in the order of the second coil spring 61, the third coil spring 62, and the first coil spring 60. If the biasing force of the second coil spring 61 were less than that of the third coil spring 62, then even if the shift key 49 is pressed in the retraction of the push rod 48a to the downshift side, the shift key 49 would not strike the clutch member 45, and no assist force would be obtained. Also, if the biasing force of the third coil spring 62 were less than that of the first coil spring 60, then when the push rod 48a is retracted to the downshift side and the second coil spring 61 presses on the shift key 49, the third coil spring 62 will contract, only the shift key 49 will move, the shift key 49 and the clutch member 45 will not be able to move away from each other, and the clutch member 45 cannot be positioned.

In this embodiment, the shift key 49 presses against the clutch member 45 only in the downshifting direction, and the two move independently in the upshifting direction. In other words, a stop ring is not provided to the clutch member 45. The overall length of the third coil spring 62 is restricted to a specific length by a restricting member (not shown), and the spacing between the clutch member 45 and the shift key 49 is ordinarily kept the same even when the two move independently. The rest of the structure is the same as in the first embodiment described above and will not be described here.

In this embodiment, in the state shown in FIG. 9 in which the push rod 48a is not pushed in, the clutch member 45 is disposed at the downshift position on the right end, and the rotation from the driver 22 is transmitted to the hub shell 23 after being reduced in speed via the downshift power transmission path, just as in the first embodiment above. More specifically, the rotation input to the driver 22 is transmitted to the ring gear 43 via the second one-way clutch 51.

When the winding lever of the shift control component 9 is operated, the link member 71 of the bell crank 26 swings and the push rod 48a is pushed in by one stage. As a result, the shift key 49 is pressed by the push rod 48a and moves to the left while rotating around the hub axle, and the clutch member 45, which is biased by the first coil spring 60, follows the shift key 49 and moves to the direct drive position. When the clutch member 45 is then disposed in the direct drive position, the clutch pawl 53 of the first one-way clutch 50, which had been put in a retracted attitude by the taper surface 45d, is returned to the erected attitude shown by the solid line in FIG. 4 by the spring force of the torsion coil spring 55, and the rotation from the driver 22 is directly transmitted to the hub shell 23 through the direct drive power transmission path, just as in the first embodiment.

When the winding lever is operated in the direct drive position and the push rod 48a is pushed in further, the shift key 49 moves further to the left, and the clutch member 45 also moves to the upshift position. When the clutch member 45 is disposed in the upshift position, the serration outer teeth 45c of the clutch member 45 and the serration inner teeth 41b of the gear frame 41 mesh with each other. In this movement to the upshift position, when the serration outer teeth 45c and the serration inner teeth 41b are disposed in the positions where they mesh, the clutch member 45 moves directly to the upshift position to the left after the clutch member 45 strikes the gear frame 41. When, however, these teeth are disposed in positions where they do not mesh, the clutch member 45 temporarily halts its movement to the left at the point when the clutch member 45 strikes the gear frame 41. However, since the clutch member 45 is pressed by the biasing force of the first coil spring 60, when the clutch member 45 rotates and the two sets of teeth 45c and 41b reach their meshing positions, the clutch member 45 moves and the two sets of teeth 45c and 41b mesh. In this state, the rotation transmitted to the driver 22 is transmitted to the hub shell 23 via the upshift transmission path just as in the first embodiment.

Since rotation is transmitted directly between the driver 22 and the ring gear 43 during such a shift from the downshift side to the upshift side, it is best to move the clutch member 45, which has no force acting upon it. Accordingly, the spring force of the first coil spring 60 for pushing the clutch member 45 may be reduced, and shift operation can be performed with a light force.

When the release lever of the shift control component 9 is operated at the upshift position, the shift key 49 is biased by the second coil spring 61 and the push rod 48a retracts by one stage to the left. The shift key 49 then presses on the clutch member 45 and attempts to move the clutch member 45 to the direct drive position. If the rider is pedaling, however, since drive force is being transmitted from the clutch member 45 to the gear frame 41, frictional force may cause the serration inner teeth 41b and the serration outer teeth 45b to remain meshed. In a case such as this, an assist force is generated and the clutch member 45 moved to the downshift side, just as in the first embodiment.

When a drive force larger than the set drive force is applied and the shift key 49 escapes in the axial direction without the clutch member 45 moving, once the gear crank 18 reaches the vicinity of top dead center or bottom dead center and the drive force decreases, the clutch member 45 will be pressed and moved by the assist force produced by the shift key 49. Accordingly, a shift will not be performed when an extremely large drive force is applied, which reduces shifting shock and helps prevent damage to the drive force transmission parts, such as the serration teeth and the one-way clutches.

When the clutch member 45 finally moves to the right, the shift key 49 is separated from the cam surface 47 by the third coil spring 62. Accordingly, there will be no noise generated by contact with the shift key 49 even if the clutch member 45 is rotated. When the clutch member 45 is then disposed in the direct drive position, rotation is transmitted via the direct drive transmission path.

When the release lever is operated in a state in which the clutch member 45 is disposed in the direct drive position, the push rod 48a retracts further, and the shift key 49 presses on the clutch member 45. At this point the taper surface 45d of the clutch member 45 comes into contact with the clutch pawl 53 of the first one-way clutch 50 and attempts to lower the clutch pawl 53 from an erected attitude to a retracted attitude. However, because the clutch pawl 53 is transmitting power from the ring gear 43 to the hub shell 23, it is not readily lowered to a retracted attitude by the biasing force of the second coil spring 61 alone. Here again, when the shift key 49 strikes the cam surface 47 of the clutch member 45, an assist force can be generated and the clutch member 45 moved in the axial direction, just as discussed above.

The same merits as in the first embodiment are obtained here as well. Additionally, the structure of the push rod 48 is simplified. In this case, however, since the biasing force is largest for the second coil spring 61, which is located in a relatively narrow space, if sufficient bending is ensured, then it is difficult to reduce the spring constant of the second coil spring 61, and there is a sharp increase in the spring force during bending. Consequently, a greater operating force is required during upshifting than in the first embodiment.

In the second embodiment, the clutch member was disposed in the downshift position when it was not pressed by the push rod, but in the embodiment shown in FIG. 10 the clutch member 45 is disposed in the upshift position by default. In this case, the second coil spring 61 is installed on the push rod 48, and the first coil spring 60 is disposed between the clutch member 45 and the hub cone 31. Also, the biasing forces of the three coil springs 60 to 62 becomes increasingly smaller in the order of the second coil spring 61, the third coil spring 62, and the first coil spring 60. The reason for setting the biasing forces of the springs in this way is the same as in the second embodiment.

As shown in FIG. 10, the operation hole 21a extends along the axis from the left end of the hub axle (the side on which the coaster brake is mounted) to the center. A bell crank (not shown) is mounted at the axial end on the left side of the hub axle 21. Because the push rod 48 strikes the triangular top of the shift key 49a, a notch surface 49b that strikes the push rod 48 is formed in the center of the shift key 49a. The first coil spring 60 is disposed in a compressed state between the clutch member 45 and the hub cone 31, just as in the second embodiment. The rest of the structure is the same as in the second embodiment and will not be described here.

In this embodiment, in the state shown in FIG. 10 where the push rod 48 is not pushed in, when the winding lever of the shift control component 9 is operated in the upshift position, the shift key 49a is pressed by the push rod 48 and the clutch member 45 is moved to the downshifting direction against the biasing force of the first coil spring 60. At this point, when no drive force is being transmitted, the shift key 49a presses the clutch member 45 via the third coil spring 62, and the clutch member 45 is moved to the direct drive position. When a drive force is being transmitted, the shift key 49a strikes the cam surface 47 while compressing the third coil spring 62 or the second coil spring 61. As a result, the clutch member 45 is moved by means of the above-mentioned assist force. When the movement is from the direct drive position to the downshift position, if a drive force has been transmitted and it is difficult for the clutch pawl 53 to assume a retracted attitude, then the clutch member 45 is moved by the assist force, the clutch pawl 53 is put into a retracted attitude, and the clutch member 45 is moved to the downshift position.

When a drive force larger than the set drive force is applied and the shift key 49a escapes in the axial direction without the clutch member 45 moving, once the gear crank 18 reaches the vicinity of top dead center or bottom dead center and the drive force decreases, the clutch member 45 will be pressed and moved by the assist force produced by the shift key 49a. Accordingly, a shift will not be performed when an extremely large drive force is applied, which reduces shifting shock and helps prevent damage to the drive force transmission parts, such as the serration teeth and the one-way clutches.

When the release lever is operated in the downshift position, the clutch member 45 is pressed in the upshifting direction by the biasing force of the first coil spring 60, the push rod 48 moves, and the clutch member 45 moves to the direct drive position. When the clutch member 45 is then disposed in the direct drive position, the clutch pawl 53 of the first one-way clutch 50, which had been put in a retracted attitude by the taper surface 45d, is returned to the erected attitude shown by the solid line in FIG. 4 by the spring force of the torsion coil spring 55, and the rotation from the driver 22 is directly transmitted to the hub shell 23 through the direct drive power transmission path, just as in the first two embodiments.

When the release lever is operated in the direct drive position and the clutch member 45 is pressed in the upshifting direction by the biasing force of the first coil spring 60, the push rod 48 moves and the clutch member 45 moves to the upshift position. When the clutch member 45 is disposed in the upshift position, the serration outer teeth 45c of the clutch member 45 and the serration inner teeth 41b of the gear frame 41 mesh with each other. In this movement to the upshift position, when the serration outer teeth 45c and the serration inner teeth 41b are disposed in the positions where they mesh, the clutch member 45 moves directly to the upshift position to the left after the clutch member 45 strikes the gear frame 41. When, however, these teeth are disposed in positions where they do not mesh, the clutch member 45 temporarily halts its movement to the left at the point when the clutch member 45 strikes the gear frame 41. However, since the clutch member 45 is pressed by the biasing force of the first coil spring 60, when the clutch member 45 rotates and the two sets of teeth 45c and 41b reach their meshing positions, the clutch member 45 moves and the two sets of teeth 45c and 41b mesh. In this state, the rotation transmitted to the driver 22 is transmitted to the hub shell 23 via the upshift transmission path just as in the first two embodiments.

Since rotation is transmitted directly between the driver 22 and the ring gear 43 during a shift from the downshift side to the upshift side, it is best to move the clutch member 45, which has no force acting upon it. Accordingly, the spring force of the first coil spring 60 for pushing the clutch member 45 may be reduced. Furthermore, since the biasing force is largest for the second coil spring 61, which has plenty of housing space, the spring force can be reduced overall, and a shift can be performed with a light force in a state in which a drive force is applied during riding.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. The push rod in the third embodiment may consist of a rod-like member as in the second embodiment. In this case, since the shift key is restricted in its movement to the axial end side by the push rod, a through-groove may be formed along the axis. In an embodiment such as this, a shift can be made at any time since an assist force will be generated even if a large force is applied. However, the push rod will be subjected to a large force here, as will the inner cable. The shifting shock will also be considerable, so the power transmission parts will have to be made stronger.

In the described embodiments, a pawl cage for preventing brake lock was provided since a coaster brake was installed, but no pawl cage is necessary if a coaster brake is not installed. The mechanism for transmitting rotation is not limited to a planet gear mechanism, and may instead be a planet roller mechanism. Thus, the scope of the invention should not be limited by the specific structures disclosed. Instead, the true scope of the invention should be determined by the following claims.

What is claimed is:

1. An internal hub transmission for a bicycle comprising:
   a hub axle having an axle axis for retaining the transmission to a bicycle frame;
   a driver rotatably supported relative to the hub axle;
   an output member rotatably supported relative to the hub axle;
   a planet gear mechanism including:
      a sun gear disposed around the hub axle;
      a gear frame rotatably supported relative to the hub axle;
      a planet gear rotatably supported on the gear frame and meshing with the sun gear;
      a ring gear rotatably supported relative to the hub axle and meshing with the planet gear;
   a first one-way clutch disposed in a transmission path between the driver and the output member;
   a second one-way clutch disposed in a transmission path between the driver and the ring gear;
   a clutch member supported on the axle for selectively changing the transmission path between the driver and the output member, wherein the clutch member rotates around the axle in response to rotation of the driver and moves axially relative to the hub axle; and
   a clutch control component that provides movement of the clutch member in the direction of the axle axis and which engages the clutch member for converting rotational motion of the clutch member into motion of the clutch member in the direction of the axle axis.

2. The internal hub transmission according to claim 1 wherein the clutch control component comprises:
   a guide surface retained to the hub axle;
   a shift key which moves along the guide surface for causing movement of the clutch member in the direction of the axle axis; and
   a shift key moving component for moving the shift key.

3. The internal hub transmission according to claim 2 wherein the clutch member includes a cam surface extending in the direction of the axle axis, and wherein the shift key presses against the cam surface for converting rotational motion of the clutch member into motion of the clutch member in the direction of the axle axis.

4. The internal hub transmission according to claim 3 wherein the hub axle includes a spiral groove, wherein the spiral groove forms the guide surface.

5. The internal hub transmission according to claim 4 wherein the guide surface inclines from approximately 10° to approximately 50° relative to the axle axis.

6. The internal hub transmission according to claim 4 wherein the cam surface is inclined from approximately 20° to approximately 70° relative to the axle axis.

7. The internal hub transmission according to claim 6 wherein the guide surface inclines from approximately 10° to approximately 50° relative to the axle axis.

8. The internal hub transmission according to claim 4 wherein the spiral groove extends through the hub axle.

9. The internal hub transmission according to claim 8 wherein the shift key has a triangular cross-sectional portion disposed within the spiral groove and perpendicular to the axle axis.

10. The internal hub transmission according to claim 9 wherein the triangular cross-sectional portion contacts the guide surface.

11. The internal hub transmission according to claim 2 wherein the clutch member selectively engages the gear frame for transmitting rotational motion of the driver to the gear frame.

12. The internal hub transmission according to claim 11 wherein the shift key moving component causes movement of the shift key toward the gear frame.

13. The internal hub according to claim 12 further comprising:
   a first biasing member for biasing the clutch member toward the gear frame;
   a second biasing member for biasing the shift key toward the clutch member; and
   a third biasing member for biasing the shift key away from the clutch member.

14. The internal hub transmission according to claim 13 wherein the shift key presses against the clutch member in opposite directions of the axle axis.

15. The internal hub transmission according to claim 14 wherein the shift key moving component comprises:
   an actuator contacting the shift key; and
   a control member slidably engaging the actuator;
   wherein at least one of the first biasing member, the second biasing member and the third biasing member is disposed for biasing the actuator and the control member in opposite directions.

16. The internal hub transmission according to claim 15 wherein the actuator presses the shift key toward the gear frame.

17. The internal hub transmission according to claim 16 wherein the first biasing member is disposed for biasing the actuator and the control member in opposite directions, wherein the first biasing member has a greater biasing force than the second biasing member, and wherein the second biasing member has a greater biasing force than the third biasing member.

18. The internal hub transmission according to claim 17 wherein the clutch member selectively engages and disengages the first one-way clutch.

19. The internal hub transmission according to claim 18 wherein the first one-way clutch is disposed in a transmission path between the ring gear and the output member.

20. The internal hub transmission according to claim 19 further comprising a third one-way clutch disposed in a transmission path between the gear frame and the output member.

21. The internal hub transmission according to claim 18 wherein the clutch member includes a cam surface extending in the direction of the axle axis, and wherein the shift key presses against the cam surface for converting rotational motion of the clutch member into motion of the clutch member in the direction of the axle axis.

22. The internal hub transmission according to claim 21 wherein the hub axle includes a spiral groove, wherein the spiral groove forms the guide surface.

23. The internal hub transmission according to claim 22 wherein the guide surface inclines from approximately 10° to approximately 50° relative to the axle axis.

24. The internal hub transmission according to claim 22 wherein the cam surface is inclined from approximately 20° to approximately 70° relative to the axle axis.

25. The internal hub transmission according to claim 24 wherein the guide surface inclines from approximately 10° to approximately 50° relative to the axle axis.

26. The internal hub transmission according to claim 22 wherein the spiral groove extends through the hub axle.

27. The internal hub transmission according to claim 26 wherein the shift key has a triangular cross-sectional portion disposed within the spiral groove and perpendicular to the axle axis.

28. The internal hub transmission according to claim 27 wherein the triangular cross-sectional portion contacts the guide surface.

29. The internal hub transmission according to claim 15 wherein the actuator presses the shift key away from the gear frame.

30. The internal hub transmission according to claim 29 wherein the second biasing member is disposed for biasing the actuator and the control member in opposite directions, wherein the second biasing member has a greater biasing force than the third biasing member, and wherein the third biasing member has a greater biasing force than the first biasing member.

31. The internal hub transmission according to claim 30 wherein the clutch member selectively engages and disengages the first one-way clutch.

32. The internal hub transmission according to claim 31 wherein the first one-way clutch is disposed in a transmission path between the ring gear and the output member.

33. The internal hub transmission according to claim 32 further comprising a third one-way clutch disposed in a transmission path between the gear frame and the output member.

34. The internal hub transmission according to claim 31 wherein the clutch member includes a cam surface extending in the direction of the axle axis, and wherein the shift key presses against the cam surface for converting rotational motion of the clutch member into motion of the clutch member in the direction of the axle axis.

35. The internal hub transmission according to claim 34 wherein the hub axle includes a spiral groove, wherein the spiral groove forms the guide surface.

36. The internal hub transmission according to claim 35 wherein the guide surface inclines from approximately 10° to approximately 50° relative to the axle axis.

37. The internal hub transmission according to claim 35 wherein the cam surface is inclined from approximately 20° to approximately 70° relative to the axle axis.

38. The internal hub transmission according to claim 37 wherein the guide surface inclines from approximately 10° to approximately 50° relative to the axle axis.

39. The internal hub transmission according to claim 35 wherein the spiral groove extends through the hub axle.

40. The internal hub transmission according to claim 39 wherein the shift key has a triangular cross-sectional portion disposed within the spiral groove and perpendicular to the axle axis.

41. The internal hub transmission according to claim 40 wherein the triangular cross-sectional portion contacts the guide surface.

42. The internal hub transmission according to claim 13 wherein the second biasing member has a greater biasing force than the third biasing member, and wherein the third biasing member has a greater biasing force than the first biasing member.

43. The internal hub transmission according to claim 42 wherein the clutch member selectively engages and disengages the first one-way clutch.

44. The internal hub transmission according to claim 43 wherein the first one-way clutch is disposed in a transmission path between the ring gear and the output member.

45. The internal hub transmission according to claim 44 further comprising a third one-way clutch disposed in a transmission path between the gear frame and the output member.

46. The internal hub transmission according to claim 43 wherein the clutch member includes a cam surface extending in the direction of the axle axis, and wherein the shift key presses against the cam surface for converting rotational motion of the clutch member into motion of the clutch member in the direction of the axle axis.

47. The internal hub transmission according to claim 46 wherein the hub axle includes a spiral groove, wherein the spiral groove forms the guide surface.

48. The internal hub transmission according to claim 47 wherein the guide surface inclines from approximately 10° to approximately 50° relative to the axle axis.

49. The internal hub transmission according to claim 47 wherein the cam surface is inclined from approximately 20° to approximately 70° relative to the axle axis.

50. The internal hub transmission according to claim 49 wherein the guide surface inclines from approximately 10° to approximately 50° relative to the axle axis.

51. The internal hub transmission according to claim 47 wherein the spiral groove extends through the hub axle.

52. The internal hub transmission according to claim 51 wherein the shift key has a triangular cross-sectional portion disposed within the spiral groove and perpendicular to the axle axis.

53. The internal hub transmission according to claim 52 wherein the triangular cross-sectional portion contacts the guide surface.

* * * * *